United States Patent
Panzer

(10) Patent No.: US 8,135,523 B2
(45) Date of Patent: Mar. 13, 2012

(54) METHOD FOR CONTROLLING A FRICTION CLUTCH

(75) Inventor: Matthias Panzer, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 740 days.

(21) Appl. No.: 12/231,747

(22) Filed: Sep. 5, 2008

(65) Prior Publication Data

US 2009/0076695 A1    Mar. 19, 2009

(30) Foreign Application Priority Data

Sep. 10, 2007 (DE) .......................... 10 2007 043 102

(51) Int. Cl.
*G06F 17/00* (2006.01)
*B60W 10/02* (2006.01)
(52) U.S. Cl. ......................................... 701/68; 477/180
(58) Field of Classification Search .................. 701/67, 701/68; 477/174, 180; 702/85–107; 714/1, 714/2, 3, 100; 192/355, 3.63, 30 W, 30 R, 192/3.55

See application file for complete search history.

(56) References Cited

U.S. PATENT DOCUMENTS

| 5,273,143 A * | 12/1993 | Voss et al. ..................... 192/3.58 |
| 5,332,074 A * | 7/1994 | Braun ........................... 192/3.63 |
| 5,390,497 A * | 2/1995 | Cottam ........................... 60/533 |
| 6,604,057 B1 * | 8/2003 | Eden et al. ..................... 702/104 |
| 2003/0087726 A1 * | 5/2003 | Mack et al. ..................... 477/181 |
| 2004/0128051 A1 * | 7/2004 | Boll et al. ......................... 701/67 |
| 2004/0210374 A1 * | 10/2004 | Werner et al. ..................... 701/67 |
| 2004/0238311 A1 * | 12/2004 | Parigger ........................ 192/84.6 |
| 2006/0009328 A1 * | 1/2006 | Jung et al. ...................... 477/176 |
| 2008/0215221 A1 * | 9/2008 | Baehr et al. ..................... 701/68 |

FOREIGN PATENT DOCUMENTS

| DE | 101 25 689 | 3/2002 |
| DE | 10 2005 030 185 | 2/2006 |
| DE | 10 2005 028 844 B4 | 1/2007 |

* cited by examiner

*Primary Examiner* — Kaitlin Joerger
*Assistant Examiner* — Patrick Cicchino
(74) *Attorney, Agent, or Firm* — Simpson & Simpson, PLLC

(57) ABSTRACT

A method is proposed in which the distance sensor of a friction clutch operated automatically by a clutch actuator is calibrated in the disengaged state, wherein if the calibration is lost the friction clutch is slowly engaged until the friction clutch is in an engaged state, and when the friction clutch is completely engaged the distance sensor is recalibrated.

9 Claims, 1 Drawing Sheet

METHOD FOR CONTROLLING A FRICTION CLUTCH

CROSS REFERENCE TO RELATED APPLICATIONS

This patent claims priority of German Patent Application No. 10 2007 043 102.5, filed Sep. 10, 2007, which application is incorporated herein by reference.

FIELD OF THE INVENTION

The invention relates to a method for controlling an automated friction clutch situated in the power train of a motor vehicle between a combustion engine and a transmission having a plurality of gears, as well as a device for that purpose.

BACKGROUND OF THE INVENTION

Methods for controlling automated friction clutches according to the forenamed species are known. The clutch travel distance covered by such friction clutches during an actuation is detected by so-called incremental displacement sensors, which count distance increments, and therefore can detect only relative clutch travel and therefore must be calibrated to detect the absolute clutch travel. A variety of possibilities for calibration are proposed in the existing art. DE 10 2005 028 844 A1 can be mentioned as an example. Here the friction clutch is completely disengaged and a distance sensor is calibrated at this point.

In individual cases it can occur that an incremental displacement sensor exhibits a problem while a vehicle is being driven after a calibration. If this problem is detected, for example, during monitoring and plausibility checking of the sensor signals, a new calibration routine must be performed. According to the existing art, to accomplish this, the friction clutch is disengaged, an engaged gear is disengaged, a neutral gear position is engaged, the clutch travel from the disengaged position to the engaged position of the friction clutch is measured, and the distance sensor is recalibrated.

BRIEF SUMMARY OF THE INVENTION

The object of the present invention is to shorten a calibration routine, such as the routine described supra.

The problem is solved by a method for controlling an automated friction clutch situated in the power train of a motor vehicle between a combustion engine and a transmission with a plurality of gears, having a clutch travel distance to traverse between a disengaged and an engaged state, where the clutch travel is detected on the basis of distance increments of a sensor that change over the clutch travel distance, and the sensor is calibrated at a prescribed position with the friction clutch completely disengaged, and when the calibration is lost the friction clutch is engaged more slowly than in an engagement process with proper calibration.

The automated friction clutch may comprise one or two friction clutches combined into a dual clutch, which are engaged when not under tension (normally closed) or preferably are disengaged when not under tension (normally open), which return automatically to the disengaged state without any actuating force from the clutch actuator, and in so doing assume one of several possible positions for calibration. Alternative or additional positions can be moved to by means of the clutch actuator; such positions can be defined, for example, by hard or elastic stops.

As sensors for detecting distance increments, incremental displacement sensors can be provided which are already contained in a preferred manner in so-called electronically commutated electric motors, which constitute the drive for the clutch actuator, to commutate them. When the transformation ratio setting between the angle of rotation of these electric motors and the clutch travel distance resulting therefrom is known, additional sensors can be dispensed with. If a measurement error or malfunction is detected when monitoring these incremental displacement sensors, the proposed method can be started in an advantageous manner. Other implausible status variables of the friction clutch, for example an unexpected slip on a prescribed clutch travel path, excessive torque transmitted through the friction clutch or unexpected rotational speed behavior of the combustion engine, can be adduced alternatively or additionally as indicators of a loss of the calibration to start the procedure.

If loss of the calibration is detected, the friction clutch is nevertheless carefully engaged, meaning more slowly than during a clutching procedure without loss of calibration. This means a loss of time when shifting from an engaged gear to a new destination gear, but the lost time is significantly less than for a new calibration routine, in which the transmission must first be shifted to a neutral position in order to be able to engage the friction clutch safely. Because of the slow engagement of the friction clutch, no safety-relevant consequences should be expected—in particular in high gears such as third gear and higher, which are not typical start-up gears. It is proposed, in particular, that a selection of gears with which the method can be used be limited to those gears which are not used as start-up gears. Alternatively or in addition, the minimum travel speed of the motor vehicle can be limited, for example to 30 km/h or preferably 50 km/h, in order to prevent a start-up of the vehicle from a standstill while the procedure is being performed, or an unwanted strong acceleration at low driving speeds. It has been found that at most a slight loss of comfort occurs at higher driving speeds during a slow engagement of the friction clutch, but that this far offsets the loss of comfort upon initiation of a new calibration routine when the calibration is lost.

Provision can also be made for the friction clutch to be completely engaged in a defined engagement position, and for the sensor to be calibrated when this engagement position is reached. In this manner, a new position for calibrating the sensor on the clutch travel path can be moved to while the friction clutch is being engaged, so that a replacement for the lost calibration is very quickly available. The position provided for the calibration can be the engagement position of the friction clutch, for example a clutch travel distance at which the friction clutch is maximally engaged. This engagement position can be defined by means of a mechanical stop, which can be implemented as a hard or elastic stop. Furthermore, the slippage occurring at the friction clutch can be evaluated and an engagement position can be detected for a prescribed clutch travel distance when the slippage becomes zero or falls below a specified value, for example 50 revolutions per minute. Furthermore, a torque transmitted through the friction clutch, derived from engine data, can be adduced as a value for the engagement position.

The proposed method can also contain a procedural step according to which the selection conditions for a new gear to be engaged are analyzed. If this target gear cannot be engaged without difficulty, it can be assumed that the friction clutch is not torque-free, i.e., that it is not completely disengaged due to the loss of the calibration. In this case, the method can include the procedure that a slow engagement is interrupted or is not even introduced, and instead a normal calibration routine is initiated. Furthermore, the method can be designed so that an interruption is made difficult, for example by suppressing influences during the slow engagement of the friction clutch which are otherwise possible during shifting, such as for example a wish of the driver. For example, in a preferred manner changes in the positions of the accelerator pedal and/or brake pedal during the execution of the method have no effect on the execution of the method. In particular, so-called coasting processes of the motor vehicle, in which the friction clutch is disengaged without operating the gas pedal, are suppressed. It goes without saying that the method can be halted when this is demanded by the driving situation, for example when the combustion engine threatens to stall as the speed is reduced during braking of the vehicle. In driving situations of this sort, to minimize stalling there can be a supportive intervention in the control of the combustion engine to reduce the torque which it is delivering.

The method is executed in an advantageous manner by means of an automated friction clutch in the power train of a motor vehicle, with at least one sensor that detects relative differences in displacement and one control device that detects a sensor signal of the sensor and controls a clutch actuator to operate the friction clutch. The clutch actuator can be driven in this case by an electrically commutated electric motor, whose incremental displacement sensors are employed simultaneously as clutch travel sensors.

BRIEF DESCRIPTION OF THE DRAWINGS

The invention will be explained in further detail on the basis of a single FIGURE.

DETAILED DESCRIPTION OF THE INVENTION

Figure 1:
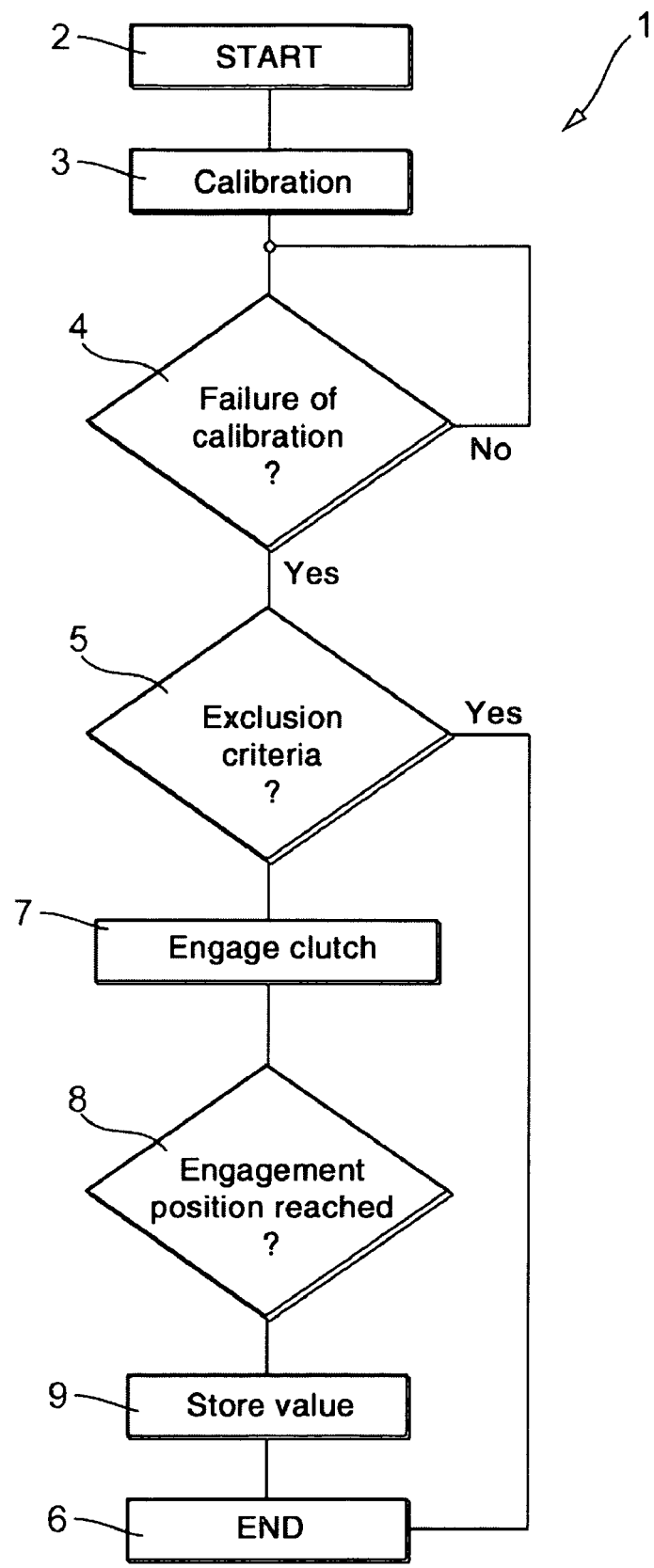

The exemplary embodiment of a program routine 1 for executing the method begins with Block 2. In Block 3 a calibration routine is performed. In Branch 4 a cyclical check is performed of whether the calibrated data are still plausible. This check can be done on the basis of other checking routines. For example, the signals from incremental displacement sensors of an electronically commutated electric motor, which may, for example, be Hall sensors, can be checked for plausibility by having their excitation patterns reviewed constantly. If an error pattern is detected, an error flag or bit can be set, which then indicates failure of the calibration in Branch 4. Failure or loss of the calibration means the loss of a clear assignment of a change in the sensor signal to an absolute change in the clutch travel.

If such a loss has occurred, it is checked in Branch 5 whether one or more exclusion criteria are present for slow engagement of the friction clutch. Exclusion criteria can be present, for example, when a start-up gear is engaged as the target gear or a new gear to be engaged is a startup gear, when the travel speed is below a prescribed value such as, for example, 50 km/h, or when a gear to be engaged cannot be engaged at all or only under more difficult conditions. If at least one of these criteria is met, program routine 1 is terminated in Block 6. Alternatively, a normal calibration can be initiated by returning to Block 3. If there are no exclusion criteria present, the friction clutch is slowly and completely engaged in Block 7. The motion of the clutch actuator can be controlled or regulated. If one or more signals from the incremental displacement sensors are still not plausible, it may be advisable to apply an energy supply to the actuator which leads to the expectation of a slow engagement.

After the friction clutch has reached an engaged state corresponding to a desired engagement position of the friction clutch, attainment of which is checked in Branch 8, this position is taken over in Block 9 as the new calibration value by the program stored in the clutch control device for performing the clutch actuation. This means that in the associated clutch control device a value is assigned to the corresponding clutch position from which counting continues in the individual distance increments, it being known from the kinematics of the clutch actuator which clutch travel distance a distance increment corresponds to. It should also be noted here that in a basic calibration routine corresponding to Block 3 two positions located far apart on the clutch travel path can be defined and the number of increments can be specified, so that when the distance between the two positions is known and the distance increments are counted off the length of a distance increment can also be determined. The zero-point calibration method, in contrary, can occur without great loss of time at each disengagement of the friction clutch, while a problem in this method can be compensated for with the method corresponding to program routine 1.

REFERENCE LABELS

1 program routine
2 block
3 block
4 branch
5 branch
6 block
7 block
8 branch
9 block

What is claimed is:

1. A method for controlling an automated friction clutch situated in a power train of a motor vehicle between a combustion engine and a transmission with a plurality of gears, having a clutch travel distance to traverse between a disengaged and an engaged state, where the clutch travel is detected on the basis of distance increments of a sensor that change over the clutch travel distance, and the sensor is calibrated at a prescribed position with the friction clutch completely disengaged, comprising: when the calibration is lost, engaging the friction clutch more slowly compared to an engagement process with proper calibration, wherein the selection of gears comprises gears that are not used to start the motor vehicle in motion.

2. The method according to claim 1, further comprising: completely engaging the friction clutch in a defined engagement position; and, calibrating the sensor when this engagement position is reached.

3. The method according to claim 2, wherein engaging the friction clutch more slowly compared to an engagement process with proper calibration includes engaging the friction clutch only when the friction clutch is for a selection of gears that are engaged when the friction clutch is engaged.

4. The method according to claim 1 wherein engaging the friction clutch more slowly compared to an engagement process with proper calibration includes engaging the friction clutch only above a prescribed travel speed of the motor vehicle.

5. The method according to claim 1, further comprising not engaging the friction clutch until a gear to be engaged has been properly engaged.

6. The method according claim 2, further comprising detecting the engagement position by evaluating a slippage present at the friction clutch.

7. The method according to claim 2, further comprising defining the engagement position by a stop in the friction clutch.

8. An automated friction clutch in a power train of a motor vehicle with:
 a clutch actuator including an electric motor; and,
 at least one sensor that detects relative differences in displacement and one control device that detects a sensor signal of the sensor and controls the clutch actuator to operate the friction clutch, wherein the control device and the clutch actuator are for:
 detecting a loss of calibration using an angle of rotation for the electric motor; and,
 when the calibration is lost, engaging the friction clutch more slowly compared to an engagement process with proper calibration, wherein engaging the friction clutch more slowly compared to an engagement process with proper calibration includes engaging the friction clutch only above a prescribed travel speed of the motor vehicle.

9. A method for controlling an automated friction clutch situated in a power train of a motor vehicle between a combustion engine and a transmission with a plurality of gears, having a clutch travel distance to traverse between a disengaged and an engaged state, comprising:
 detecting the clutch travel on the basis of distance increments of a sensor that change over the clutch travel distance;
 calibrating the sensor at a prescribed position with the friction clutch completely disengaged; and,
 when the calibration is lost, engaging the friction clutch more slowly compared to an engagement process with proper calibration, wherein engaging the friction clutch more slowly compared to an engagement process with proper calibration includes engaging the friction clutch only above a prescribed travel speed of the motor vehicle.

* * * * *